United States Patent [19]

Young et al.

[11] Patent Number: 5,761,458
[45] Date of Patent: Jun. 2, 1998

[54] INTELLIGENT BUS BRIDGE FOR INPUT/OUTPUT SUBSYSTEMS IN A COMPUTER SYSTEM

[75] Inventors: Bruce Young, Tigard; Rick Coulson, Portland, both of Oreg.

[73] Assignee: Intel Corporation, Santa Clara, Calif.

[21] Appl. No.: 850,643

[22] Filed: May 2, 1997

Related U.S. Application Data

[63] Continuation of Ser. No. 604,491, Feb. 21, 1996, abandoned, which is a continuation of Ser. No. 309,106, Sep. 20, 1994, Pat. No. 5,548,730.

[51] Int. Cl.$^6$ ............................................. G06F 13/00
[52] U.S. Cl. ............................................. 395/308; 395/309
[58] Field of Search ............................................. 395/306, 308, 395/309, 280

[56] References Cited

U.S. PATENT DOCUMENTS 4,754,397  6/1988  Varalya et al. ............................ 364/200
5,249,279  9/1993  Schmenk et al. ........................... 395/425
5,499,346  3/1996  Amini et al. ............................... 395/308
5,555,430  9/1996  Gephardt et al. .......................... 395/800

*Primary Examiner*—Glenn A. Auve
*Attorney, Agent, or Firm*—Blakely, Sokoloff, Taylor & Zafman

[57] ABSTRACT

An intelligent bus bridge contained in a single integrated circuit chip along with computer systems and server systems that employ intelligent input/output subsystems. The intelligent bus bridge includes a local processor coupled for communication over a local component bus, a local memory controller that enables access to a local memory from the local component bus, and a component bus bridge that propagates accesses between the local component bus and a system component bus. The single integrated circuit chip enables dual-porting of the local memory controller without significant increases in input/output pins. A mode control input to the intelligent bus bridge indicates whether the intelligent bus bridge functions in a local master mode or a host master mode in a computer or server system.

15 Claims, 7 Drawing Sheets

INTELLIGENT BUS BRIDGE FOR INPUT/OUTPUT SUBSYSTEMS IN A COMPUTER SYSTEM

This is a continuation of application No. 08/604,491, filed Feb. 21, 1996 now abandoned, which is a continuation of application No. 08/309,106, filed Sep. 20, 1994, now U.S. Pat. No. 5,548,730.

BACKGROUND OF THE INVENTION

1. Field of the Invention:

The present invention pertains to the field of computer system architecture. More particularly, this invention relates to an intelligent bus bridge for implementing intelligent input/output subsystems in computer and server systems.

2. Background:

High performance computer systems commonly include intelligent input/output subsystems. Such an intelligent input/output subsystem typically includes a microprocessor that performs specialized input/output functions. For example, such an intelligent input/output subsystem may perform complex communication network interface functions or disk control functions for the computer system. In such a system, the microprocessor in the intelligent input/output subsystem performs the specialized functions required according to the type of intelligent input/output subsystem.

Typically, such an intelligent input/output subsystem includes a set of specialized input/output devices coupled for communication over a component bus. Such an intelligent input/output subsystem also usually includes a local memory. The microprocessor in such an intelligent input/output subsystem typically performs the specialized input/output functions via the component bus without interfering with operations by other processors in the computer system. Such isolation of input/output transactions on the component bus typically enables improved performance by the main processor or processors in such a computer system.

Standard component buses that couple intelligent input/output subsystems to other elements of the computer system typically impose electrical loading limitations. Such electrical loading limitations impose limits on the number of components coupled to the standard component bus. For example, one prior bus standard requires that each connector on a system component interconnect bus presents only one electrical load. Such electrical loading limitations ensure that signal quality on a fully loaded bus is sufficient for reliable operation.

Some intelligent input/output subsystems contain a large number of components that communicate via a local component bus. Such a large number of components usually exceeds the electrical loading requirements imposed on each connector of a standard component bus. As a consequence, such an intelligent input/output subsystems typically includes a bus bridge circuit that couples the local component bus to other component buses in the computer system. Such a bus bridge electrically isolates the local microprocessor, the local memory and the local components of the intelligent input/output subsystem from the other component buses. Such a bus bridge circuit enables the input/output subsystem to contain the large number of components required to implement a specialized input/output function while meeting electrical loading requirements on other component buses.

Such an intelligent input/output subsystem also typically requires a large number of integrated circuit chip packages to implement such hardware functions. For example, an intelligent input/output subsystem typically includes one component that functions as a bus bridge to isolate the local component bus from the system component bus. Such an intelligent input/output subsystem also usually includes a memory controller component for controlling the local memory. In addition, such an intelligent input/output subsystem also usually includes a local microprocessor component for performing the specialized input/output functions.

Typically, the local microprocessor component, the bus bridge component, and the memory controller component are each coupled to the local component bus as independent bus agents. As a consequence, the bus bridge, the microprocessor, and the memory controller components require the implementation of a large number of input/output data pins and control pins to function as bus agents on the local component bus. Unfortunately, such a large number of input/output pins greatly increases the cost of such an intelligent input/output subsystem.

In addition, the local microprocessor in such an intelligent input/output subsystem often requires the implementation of a bus interface or bus bridge circuit between the local component bus and the native bus of the microprocessor. Such bus interfaces usually increases the component count required to implement such a system, and thereby increases the cost of such an intelligent input/output subsystem. Moreover, the local microprocessor must typically contend with other bus agents coupled to the local component bus for access to the local memory through the memory controller. Unfortunately, such bus contentions typically reduce the performance of the local microprocessor while performing the specialized input/output functions for the intelligent input/output subsystem.

SUMMARY AND OBJECTS OF THE INVENTION

One object of the present invention is to provide an intelligent bus bridge for implementing an intelligent input/output subsystem.

Another object of the present invention is to provide an intelligent bus bridge for implementing an intelligent input/output subsystem in a computer system or a server system.

Another object of the present invention is to provide an intelligent bus bridge with an integrated local processor and memory controller.

Another object of the present invention is to provide an intelligent bus bridge with an integrated component bus bridge that isolates components of the intelligent input/output subsystem from a system component bus.

A further object of the present invention is to provide an intelligent bus bridge that functions in either a host master mode wherein components are configured by a host processor or a local master mode wherein components are configured by the local processor.

Another object of the present invention is to provide the memory controller with separate ports for the local processor and for bus agents coupled to the local component bus without increasing the input/output pin count of the intelligent bus bridge.

These and other objects of the present invention are provided by an intelligent bus bridge contained in a single integrated circuit chip and systems that employ the intelligent bus bridge. The intelligent bus bridge includes a local processor coupled for communication over a local component bus, a local memory controller that enables access to a local memory from the local component bus, and a component bus bridge that propagates accesses between the local component bus and a system component bus. The local memory controller includes a port that enables access to the local memory from the local component bus and a port that enables access to the local memory from a local processor bus of the local processor. The local processor senses a mode control input to the intelligent bus bridge that indicates whether the intelligent bus bridge functions in a local master mode or a host master mode and then enables a hierarchical configuration space access mechanism of the component bus bridge accordingly.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
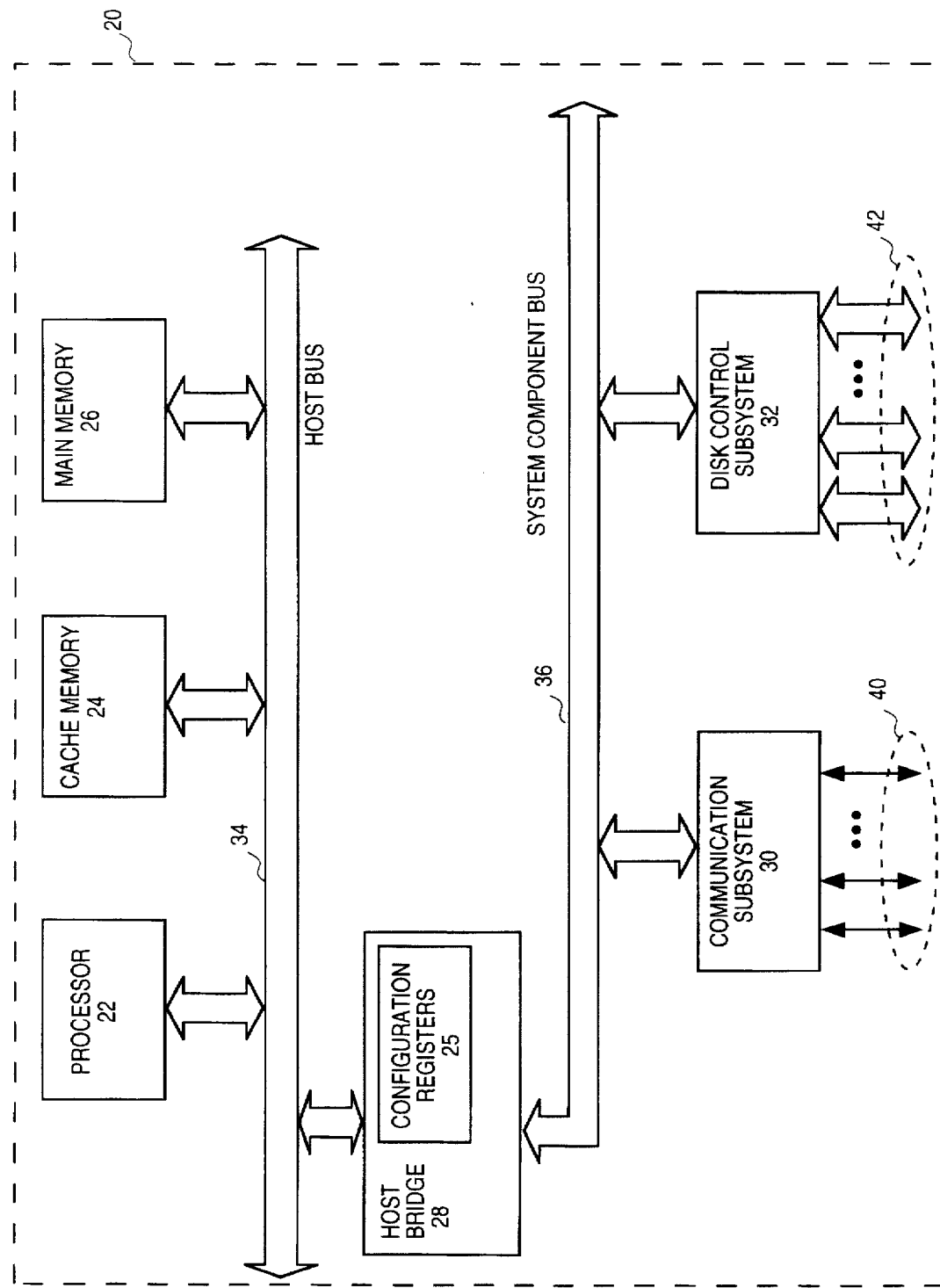
FIG. 1 illustrates a computer system for one embodiment which comprises a processor, a cache memory, and a main memory coupled via a host bus and input/output subsystems coupled via a system component bus.

FIG. 1 illustrates a computer system 20 for one embodiment. The computer system 20 comprises a processor 22, a cache memory 24, and a main memory 26. The processor 22, the cache memory 24, and the main memory 26 are coupled for communication via a host bus 34. The computer system 20 further comprises a communication subsystem 30 and a disk control subsystem 32. The communication subsystem 30 and the disk control subsystem 32 are coupled for communication via a system component bus 36.

For one embodiment, the system component bus 36 conforms to the Peripheral Component Interconnect (PCI) Local Bus Specification, revision 2.0 published April 30, 1993 by the PCI Special Interest Group.

The communication subsystem 30 performs network communication switching hub functions via a set of communication links 40. The communication subsystem 30 is an intelligent input/output subsystem that includes a microprocessor for controlling the switching hub functions for the communication links 40.

The disk control subsystem 32 enables access to a set of disk devices (not shown) coupled to a set of input/output buses 42. The disk control subsystem 32 is an intelligent input/output subsystem that includes a microprocessor that implements specialized control functions for controlling access to the disk devices by the computer system 20.

The computer system 20 further comprises a host bridge 28 that enables communication between bus agents coupled to the host bus 34 and bus agents coupled to the system component bus 36. The host bridge 28 "bridges" bus transactions originating on the host bus 34 and targeted for the communication subsystem 30 or the disk control subsystem 32. The host bridge 28 also bridges bus transactions originating on the system component bus 36 and targeted for the processor 22, the cache memory 24, or the main memory 26.

The host bridge 28 contains a set of configuration registers 25 that are programmed by the basic input/output software (BIOS) of the computer system 20 executed by the processor 22. The configuration registers 25 in the host bridge 28 identify the host bridge 28 as a bus bridge to a system component bus conforming to the PCI local bus standard. The configuration registers 25 on the host bridge 28 also include registers that define the bus transactions that are propagated between the host bus 34 and the system component bus 36.

The host bridge 28 also enables a hierarchical configuration space mechanism according to the PCI local bus standard. The host bridge 28 enables the BIOS of the computer system 20 to access the configuration spaces of the communication subsystem 30 and the disk control subsystem 32 via the system component bus 36.

The host bridge 28 electrically isolates the communication subsystem 30 and the disk control subsystem 32 from the host bus 34. The host bridge 28 enables communication among the processor 22, the cache memory 24, and the main memory 26 while minimizing interference caused by communication transactions among bus agents coupled to the system component bus 36.

The PCI local bus standard for one embodiment enables high bandwidth communication among a wide variety of device components coupled to the system component bus 36. The PCI local bus standard enables a "plug and play" communication protocol including the configuration space mechanism. The configuration space mechanism enables the BIOS of the processor 22 to determine device types coupled to the PCI bus hierarchy in the computer system 20 and to control the configuration of the components and subsystems coupled to the PCI buses. The PCI bus protocol enables a hierarchical access to the configuration spaces of multiple nested PCI buses in the computer system 20.

Figure 2:
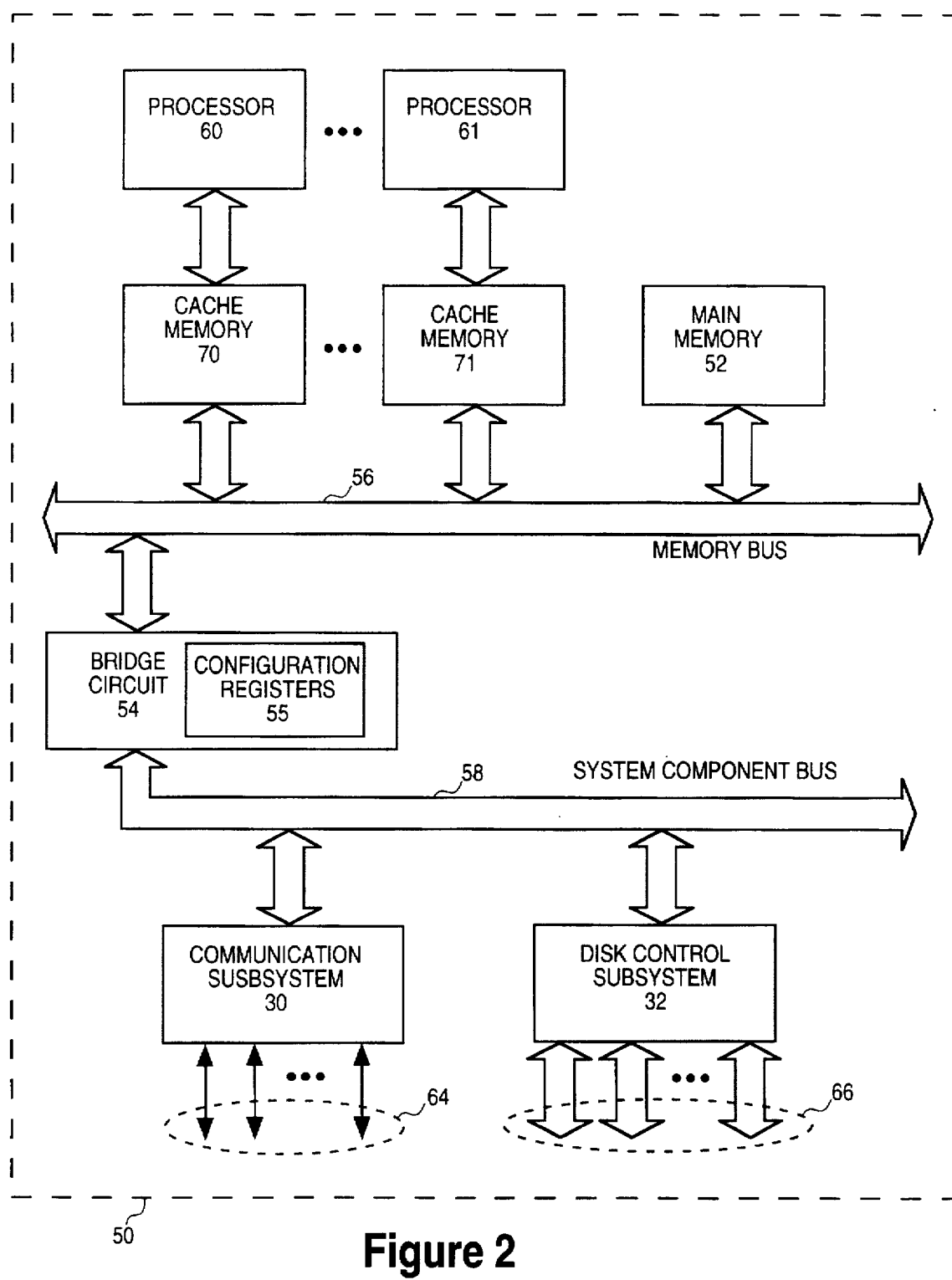
FIG. 2 illustrates a server system for another embodiment which comprises a set of processors along with a set of corresponding cache memories coupled via a memory bus and input/output subsystems coupled via a system component bus.

FIG. 2 illustrates a server system 50 for another embodiment. The server system 50 comprises a set of processors 60—61 along with a set of corresponding cache memorys 70—71. The server system 50 also includes a main memory 52. The processors 60 and 61 communicate through the cache memorys 70 and 71 to the main memory 52 via a memory bus 56.

The server system 50 further comprises the communication subsystem 30 and the disk control subsystem 32. The communication subsystem 30 and the disk control subsystem 32 are coupled for communication over a system component bus 58. The server system 50 includes a bridge circuit 54 that enables communication between agents coupled to the memory bus 56 and agents coupled to the system component bus 58.

The bridge circuit 54 propagates or "bridges" bus transactions between the memory bus 56 and the system component bus 58. The bridge circuit 54 contains a set of configuration registers 55 that are programmed by the BIOS of the server system 50. The configuration registers 55 in the bridge circuit 54 identify the bridge circuit 54 as a bus bridge, and define the bus transactions that are propagated between the memory bus 56 and the system component bus 58. The bridge circuit 54 also enables a hierarchical configuration space mechanism that enables the BIOS of the server system 50 to access the configuration spaces of the communication subsystem 30 and the disk control subsystem 32 via the system component bus 58.

The bridge circuit 54 electrically isolates the communication subsystem 30 and the disk control subsystem 32 from the memory bus 56. The memory bus 56 enables communication among the cache memories 70—71, and the main memory 52 while the bridge circuit 54 minimizes interference caused by communication transactions among bus agents coupled to the system component bus 58.

Figure 3:
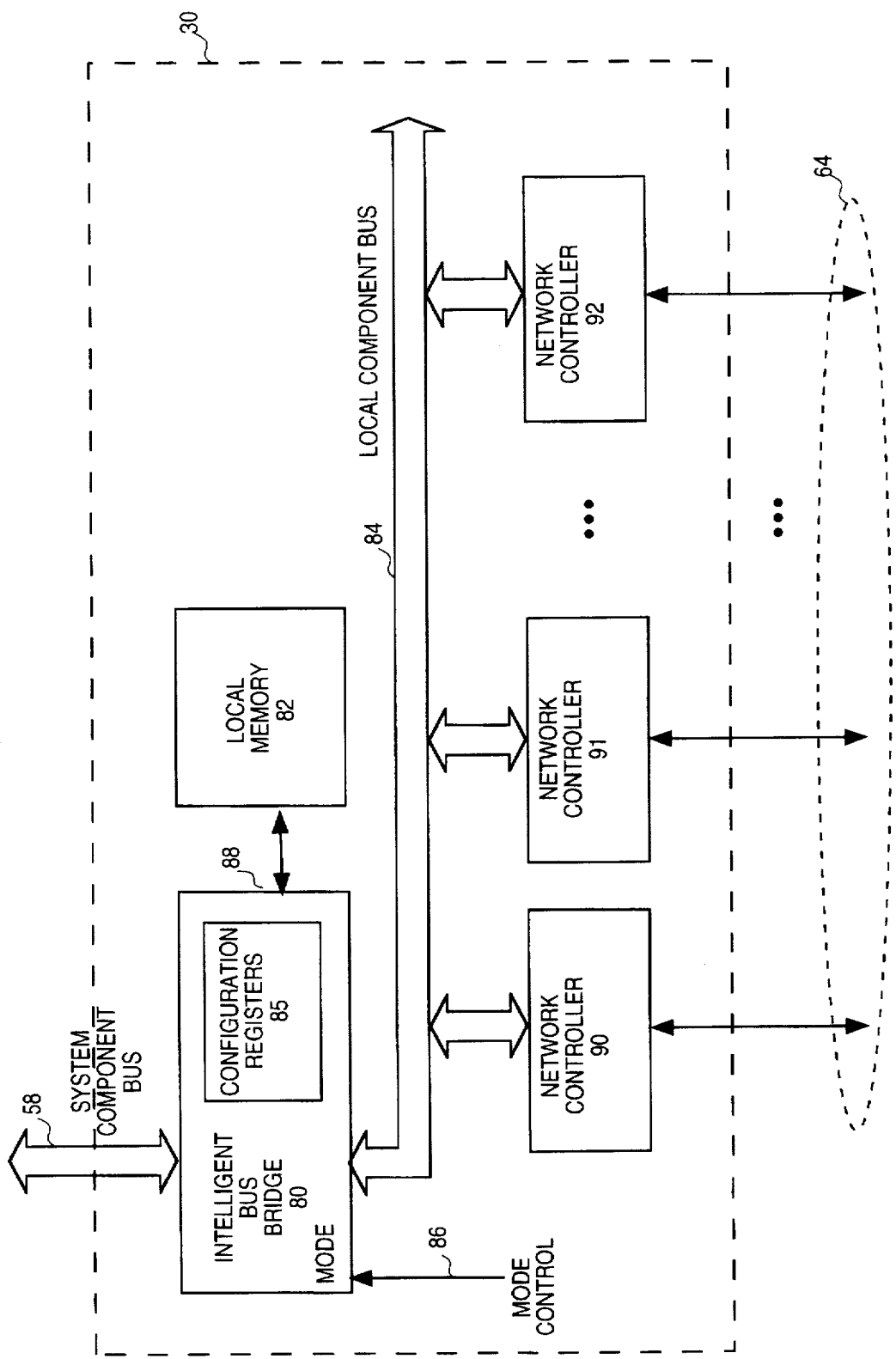
FIG. 3 illustrates the communication subsystem for one embodiment which comprises an intelligent bus bridge, a local memory, and a set of network controllers which are coupled for communication over a local component bus.

FIG. 3 illustrates the communication subsystem 30 for one embodiment. The communication subsystem 30 comprises an intelligent bus bridge 80, a local memory 82, and a set of network controllers 90—92. The network controllers 90—92 are coupled for communication over a local component bus 84.

The network controllers 90—92 enable communication over the communication links 64 or alternatively the communication links 40. For one embodiment, the network controllers 90—92 each comprise an ethernet network controller.

The intelligent bus bridge 80 is a single integrated circuit package that performs microprocessor functions, bus bridge functions, and memory controller functions. The intelligent bus bridge 80 performs control functions for the network controllers 90—92. The network control functions of the microprocessor in the intelligent bus bridge 80 insulates the host processor or processors 60 and 61 from the control transactions required for the network controllers 90—92 as well as peer to peer transfers between the network controllers 90—92.

The intelligent bus bridge 80 enables access to the local memory 82 by the network controllers 90—92. The network controllers 90—92 exchange communication messages in the local memory 82 via the local component bus 84. In addition, the bus agents coupled to the system component bus 58 access the messages in the local memory 82 through the intelligent bus bridge 80.

The intelligent bus bridge 80 enables communication between agents coupled to the system component bus 58 and agents coupled to the local component bus 84. For one embodiment, the system component bus 58 and the local component bus 84 each conform to the PCI local bus specification and the intelligent bus bridge 80 performs PCI to PCI bus bridge functions. The local component bus 84 enables access to the configuration spaces of the network controllers 90—92 by the intelligent bus bridge 80.

The intelligent bus bridge 80 includes a set of configuration registers 85 that conform to the PCI local bus specification. The configuration registers 85 in the intelligent bus bridge 80 determine the mapping of accesses on the system component bus 58 that are propagated to the local component bus 84 and that determine the mapping of accesses originating on the local component bus 84 that are propagated to the system component bus 58. The configuration registers 85 in the intelligent bus bridge 80 also contain parameters that define the memory address space for the local memory 82.

The intelligent bus bridge 80 includes a memory controller that enables access to the local memory 82 via a memory bus 88. The intelligent bus bridge 80 enables accesses to the local memory 82 from both the system component bus 58 and the local component bus 84 according to the configuration registers in the intelligent bus bridge 80.

The intelligent bus bridge 80 includes a mode control input pin. The mode control input pin of the intelligent bus bridge 80 is driven by a mode control signal 86. The mode control signal 86 determines whether the intelligent bus bridge 80 functions in a local master mode or in a host master mode. In the local master mode, the network controllers 90—92 are configured by the intelligent bus bridge 80. In the local master mode, the intelligent bus bridge 80 blocks hierarchical configuration space accesses originating on the system component bus 58. In the host master mode, the network controllers 90—92 are configured via configuration space accesses originating from a host processor via the system component bus 58. In the host master mode, the intelligent bus bridge 80 performs a hierarchical configuration space enable and disable access mechanism that enables configuration space accesses to the network controllers 90—92 as well as portions of the intelligent bus bridge 80 from the system component bus 58.

Figure 4:
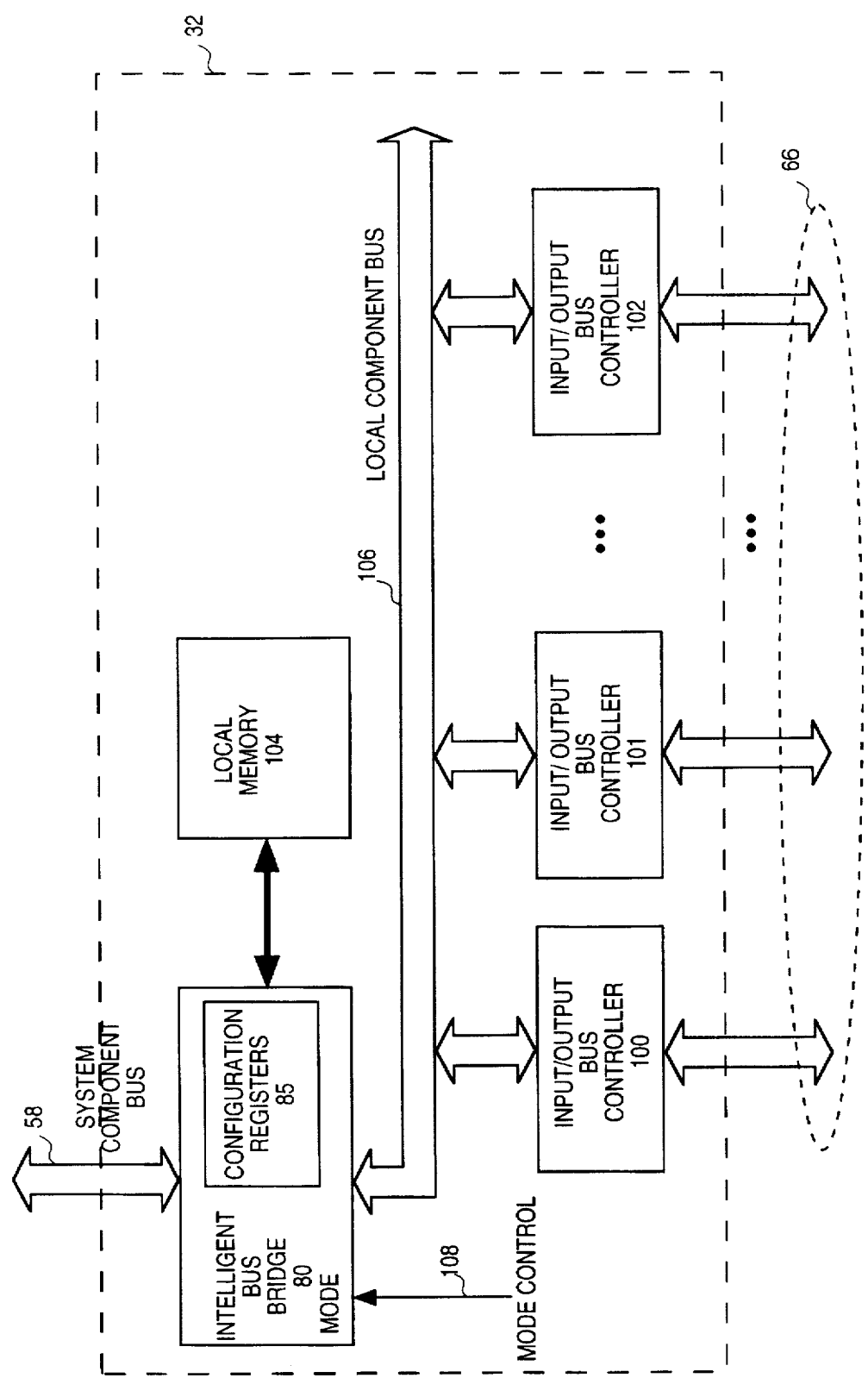
FIG. 4 illustrates the disk control subsystem for one embodiment which comprises the intelligent bus bridge, a local memory, and a set of input/output bus controllers that communicate via a local component bus.

FIG. 4 illustrates the disk control subsystem 32 for one embodiment. The disk control subsystem 32 comprises the intelligent bus bridge 80, a local memory 104, and a set of input/output bus controllers 100—102. The input/output bus controllers 100—102 communicate via a local component bus 106. The input/output bus controllers 100—102 enables communication to a set of disk drives (not shown) coupled to the input/output buses 66. For one embodiment, the input/output bus controllers 100—102 each comprise a small computer systems interface (SCSI) bus controller and the input/output buses 66 each comprise an SCSI bus.

The intelligent bus bridge 80 performs control functions for the input/output bus controllers 100—102. The input/output control functions of the microprocessor in the intelligent bus bridge 80 insulates the host processor or processors from the control functions required for the input/output bus controllers 100—102.

The intelligent bus bridge 80 enables access to the local memory 104 by the input/output bus controllers 100—102. The input/output bus controllers 100—102 exchange communication messages in the local memory 104 via the local component bus 106 and the bus agents coupled to the system component bus 58 access the messages in the local memory 104 through the intelligent bus bridge 80.

The configuration registers 85 in the intelligent bus bridge 80 determine the mapping of accesses on the system component bus 58 that are propagated to the local component bus 106 and that determine the mapping of accesses originating on the local component bus 106 that are propagated to the system component bus 58. The configuration registers 85 in the intelligent bus bridge 80 also contain parameters that define the memory address space for the local memory 104. The intelligent bus bridge 80 enables accesses to the local memory 104 from both the system component bus 58 and the local component bus 104 according to the configuration registers in the intelligent bus bridge 80.

The mode control input pin of the intelligent bus bridge 80 in this embodiment is driven by a mode control signal 108.

The mode control signal 108 determines whether the intelligent bus bridge 80 functions in the local master mode or in the host master mode.

Figure 5:
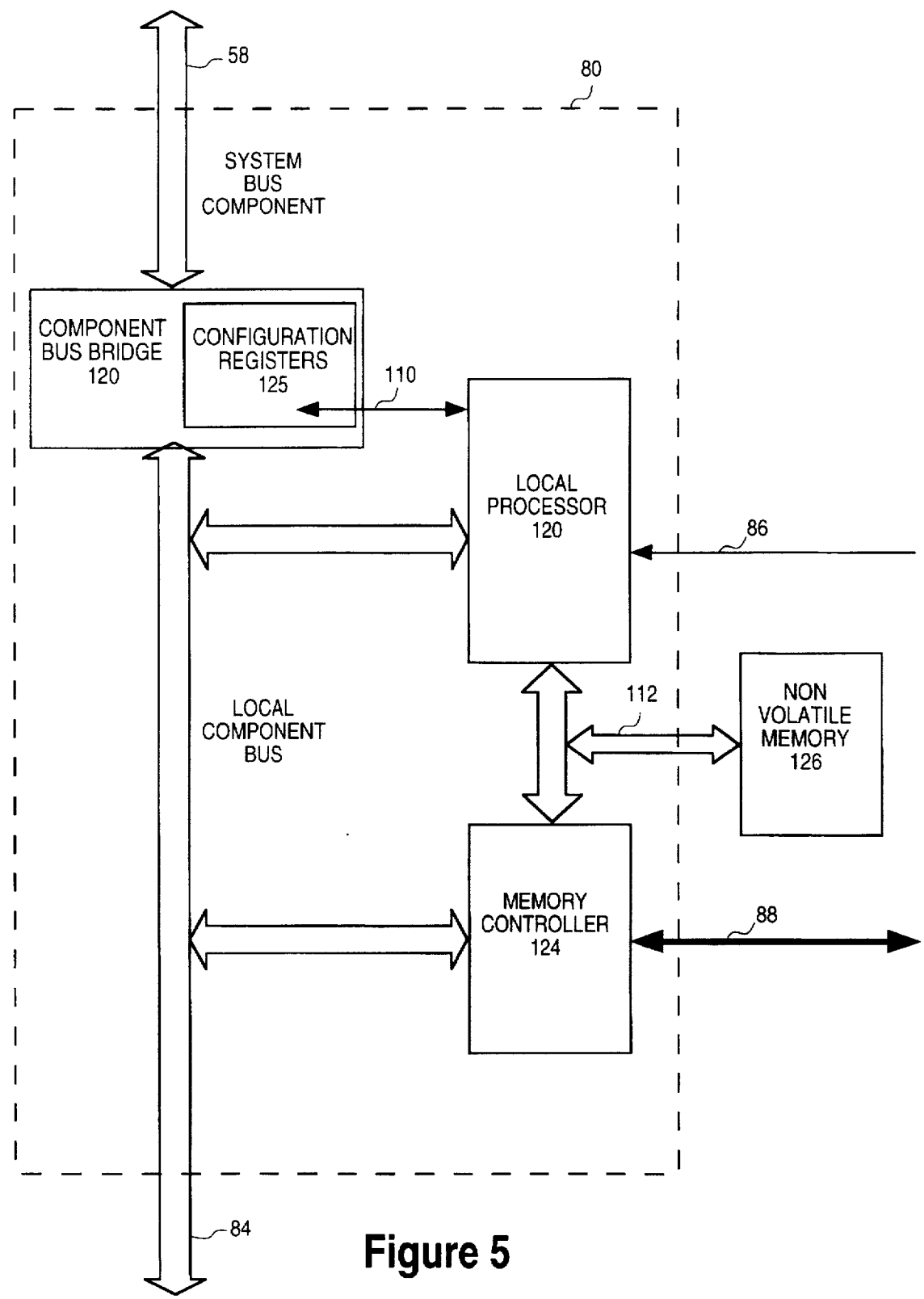
FIG. 5 illustrates the intelligent bus bridge for one embodiment which comprises a component bus bridge, a local processor, and a memory controller.

FIG. 5 illustrates the intelligent bus bridge 80 for one embodiment. The intelligent bus bridge 80 comprises a component bus bridge 120, a local processor 122, and a memory controller 124.

A component bus bridge 120 bridges accesses between the system component bus 58 and a local component bus 84. The component bus bridge 120 contains a set of configuration registers 125 that are accessed by the local processor 122 via a bridge control bus 110. For one embodiment, the component bus bridge 120 functions as a PCI to PCI bus bridge wherein the system component bus 58 is the primary bus and the local component bus 84 is the secondary bus.

The local processor 122 and the memory controller 124 are each coupled as bus agents to the local component bus 84 internal the intelligent bus bridge 80. The memory controller 124 is a dual ported memory controller enabling access to the local memory 82. The dual ports of the memory controller 124 include a port through the local component bus 84 and a port coupled to a local processor bus 112 of the local processor 122. The local component bus port of the memory controller 124 enables access to the local memory 82 by bus agents coupled to the local component bus 84 including the network controllers 90—92. The local processor bus port to the memory controller 124 enables the local processor 122 to access the local memory 82 without arbitrating for control over the local component bus 84.

The local processor 122 senses the state of the mode control signal 86 to determine whether to initialize the intelligent bus bridge 80 in the local master mode or the host master mode. For one embodiment, the local processor 122 boots from a non volatile memory 126 in the local master mode of the intelligent bus bridge 80. For other embodiments, the local processor 122 boots from main memory or from a local read only memory (not shown).

For example, the non volatile memory 126 can store a set of software routines for the local processor 122. For one embodiment, the intelligent bus bridge 80 is coupled to the non volatile memory 126 via the local processor bus 112. For another embodiment, the intelligent bus bridge 80 is coupled to the non volatile memory 126 via the local component bus 84.

Figure 6:
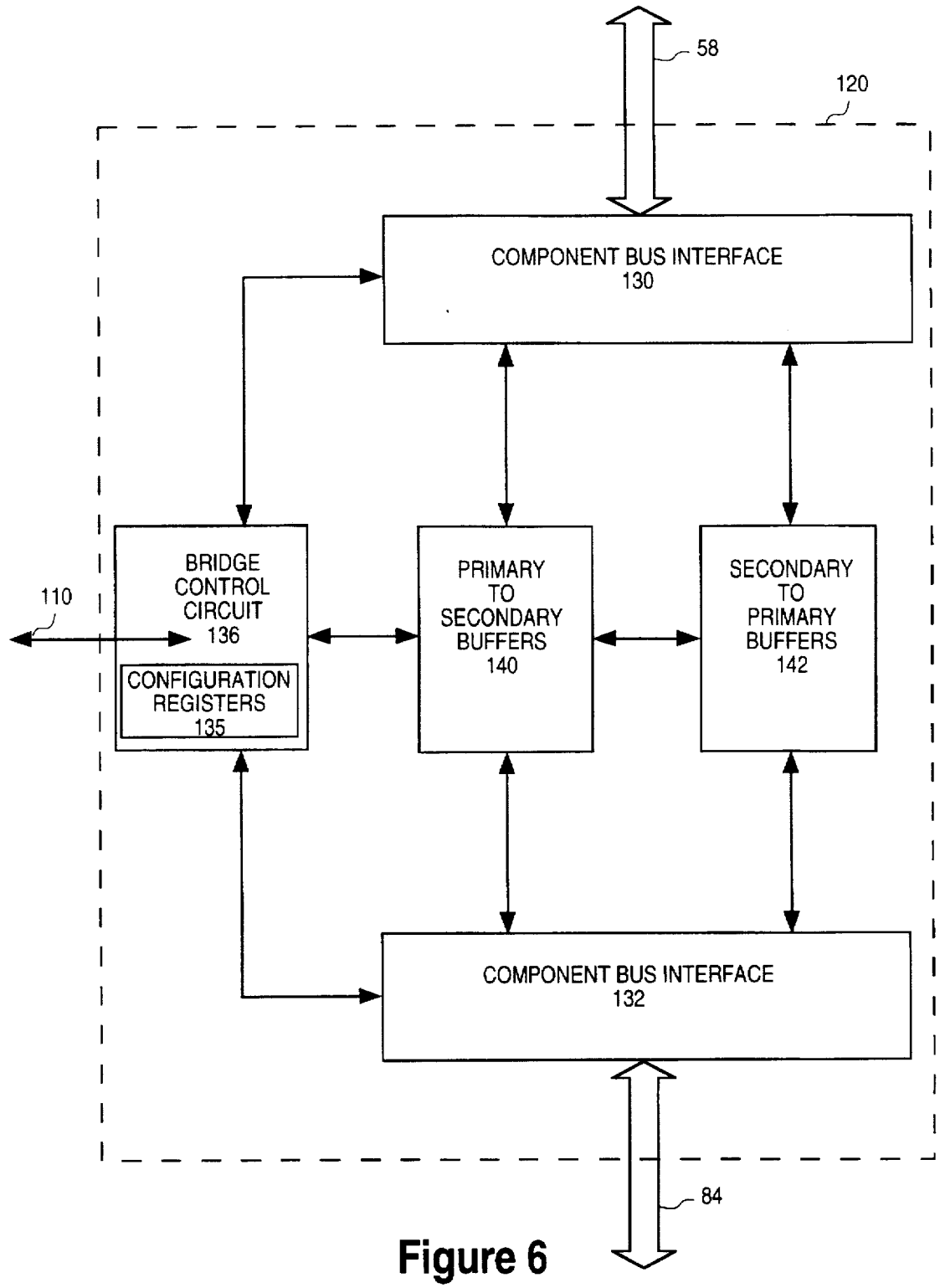
FIG. 6 illustrates the component bus bridge for one embodiment which comprises a pair of component bus interfaces, a bridge control circuit, a set of primary to secondary buffers, and a set of secondary to primary buffers.

FIG. 6 illustrates the component bus bridge 120 for one embodiment. The component bus bridge 120 comprises a pair of component bus interfaces 130 and 132, a bridge control circuit 136, a set of primary to secondary buffers 140, and a set of secondary to primary buffers 142.

The component bus interface 130 provides a full function component bus interface to the system component bus 58. The component bus interface 132 provides a full function component bus interface to the local component bus 84. For one embodiment, the component bus interfaces 130 and 132 each provide a full function component bus interface according to the PCI local bus specification.

The component bus interface 130 senses access cycles on the system component bus 58 targeted for bus agents coupled to the local component bus 84 including the local processor 122, the memory controller 124, and the network controllers 90—92. The component bus interface 130 receives the access cycles from the system component bus 58 and writes the data for the access cycles into the primary to secondary buffers 140. The component bus interface 130 then signals the bridge control circuit 136 to indicate that data is available in the primary to secondary buffers 140. The bridge control circuit 136 signals the component bus interface 132 indicating the availability of data in the primary to secondary buffers 140. The component bus interface 132 arbitrates for control over the local component bus 84 and thereafter generates an access cycle over the local component bus 84 to transfer the data from the primary to secondary buffers 140 to the targeted bus agent on the local component bus 84.

The bridge control circuit 136 coordinates the passing of data buffers in the primary to secondary buffers 140 and the secondary to primary buffers 142 between the component bus interfaces 130 and 132. The bridge control circuit 136 also includes a set of configuration registers 135. The configuration registers 135 in the bridge control circuit 136 determine the address mapping for accesses propagated by the component bus bridge 120. The configuration registers 135 in the bridge control circuit 136 determine the accesses that are propagated from the system component bus 58 (primary bus) to the local component bus 84 (secondary bus). The configuration registers 135 in the bridge control circuit 136 also determine which accesses originating on the local component bus 84 are propagated to the system component bus 58.

Accesses originating on the system component bus 58 are propagated to the local component bus 84 through the primary to secondary buffers 140. Accesses originating on the local component bus 84 are propagated to the system component bus 58 through the secondary to primary buffers 142. For one embodiment, the primary to secondary buffers 140 and the secondary to primary buffers 142 each comprise a first in first out memory.

The local processor 122 writes the configuration registers 135 in the bridge control circuit via the bridge control bus 110. The local processor 122 also writes control registers in the bridge control circuit 136 to enable and disable the hierarchical configuration space mechanism of the component bus bridge 120.

Figure 7:
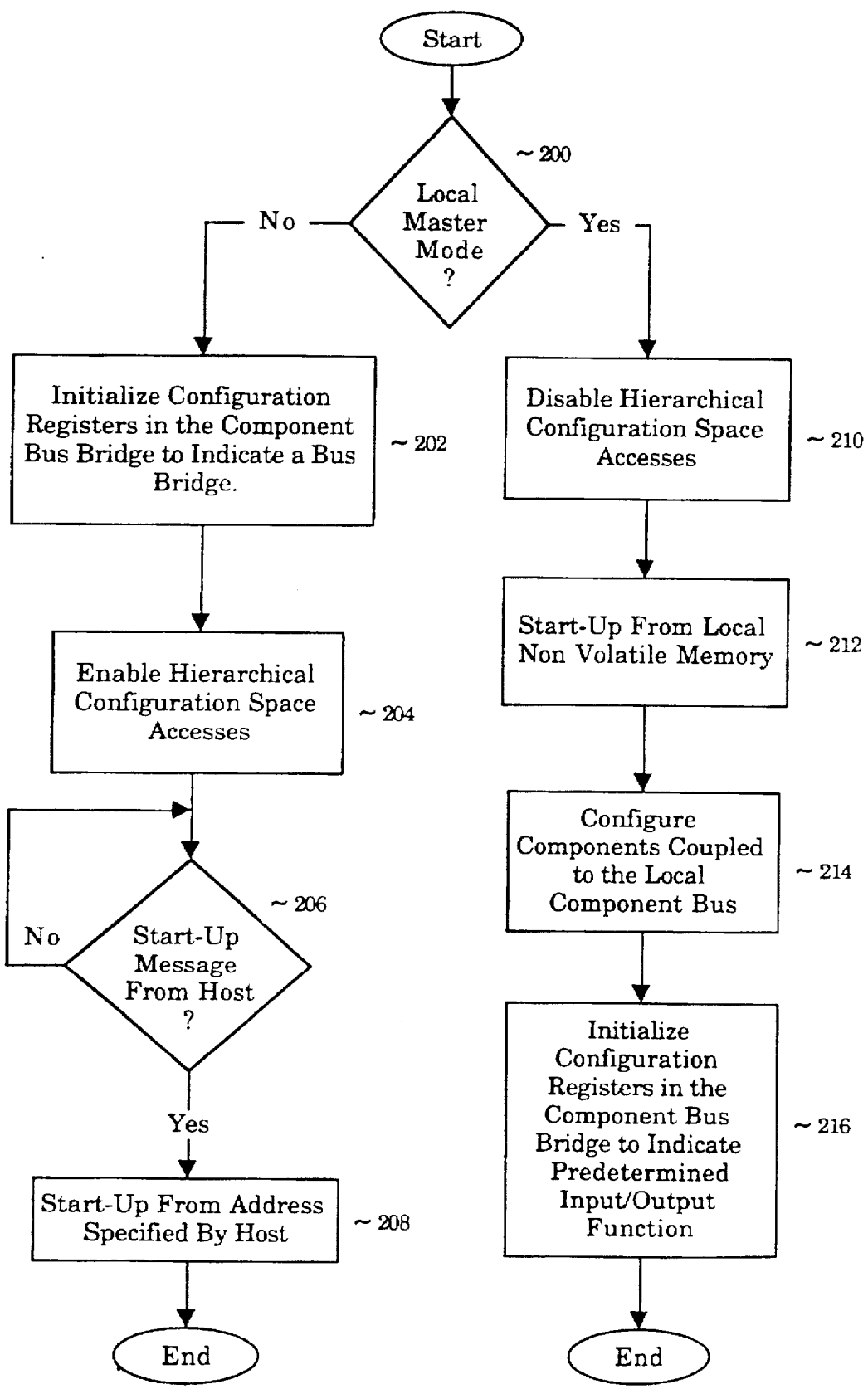
FIG. 7 shows a flow diagram illustrating the initialization routines of the local processor for either the local master mode or the host master mode.

FIG. 7 is a flow diagram illustrating the initialization routines of the local processor 122 for one embodiment. At decision block 200, the local processor 122 determines the state of the mode control signal 86. The mode control signal 86 indicates either the local master mode or the host master mode. If the mode control signal 86 at decision block 200 indicates the local master mode then control proceeds to block 210. If the mode control signal 86 at decision block 200 indicates the host master mode then control proceeds to block 202.

At block 202, the local processor 122 writes the configuration registers in the bridge control circuit 136 to indicate a bus bridge in response to a configuration space access originating over the system component bus 58. Thereafter, at block 204 the local processor 122 writes to a control register in the bridge control circuit 136 to enable the hierarchical configuration space access mechanism of the component bus bridge 120. The hierarchical configuration space access mechanism enables a host processor via the system component bus 58 to access the configuration spaces the bus agents coupled to the local component bus 84 including the local processor 122, the memory controller 124, and the network controllers 90—92.

Thereafter at decision block 206, the local processor 122 waits for a start-up message from a host processor via the system component bus 58. For one embodiment, the host start-up message comprises a write transaction over the system component bus 58 targeted for a configuration register in the bridge control circuit 136. The targeted configuration register specifies a start-up address for the local processor 122. After the start-up message is received at decision block 206 control proceeds to block 208.

At block 208, the local processor 122 starts up from the address specified by the host in the configuration register in the bridge control circuit 136. The address specified by the host through the configuration register in the bridge control circuit 136 may specify an address in the non volatile memory 126 or the local memory 104 or the main memory 26 or the main memory 52.

In the local master mode at block 210, the local processor 122 disables the hierarchical configuration space access mechanism of the component bus bridge 120 by writing to a control register in the bridge control circuit 136 via the bridge control bus 110. Thereafter at block 212, the local processor 122 starts up from a predetermined address in the non volatile memory 126. The non volatile memory 126 contains a start-up code as well as well as code that implements the specialized communication functions required for the communication subsystem 30.

At block 214, the local processor 122 while executing the start-up code from the non volatile memory 126 configures the components coupled to the local component bus 84 including the network controllers 90—92 and the memory controller 124. Thereafter at block 216, the local processor 122 initializes the configuration registers in the bridge control circuit 136. The local processor 122 writes to the configuration registers in the bridge control circuit 136 such that the configuration registers indicate a predetermined input/output function in response to read configuration space accesses via the system component bus 58 by a host processor.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. An intelligent bus bridge contained in an integrated circuit chip, comprising:

a local processor adapted for communication over a local component bus;

a local memory controller that enables access to a local memory from the local component bus;

a component bus bridge that propagates accesses between the local component bus and a system component bus; and a mode control input pin driven by a mode control signal, the mode control signal determining whether the intelligent bus bridge functions in a local master mode by configuring bus agents coupled to the local component bus or functions in a host master mode wherein the bus agents coupled to the local component bus are configured via the system component bus.

2. The intelligent bus bridge of claim 1 wherein the local memory controller includes a port that enables access to the local memory from the local component bus and a port that enables access to the local memory from a local processor bus of the local processor.

3. The intelligent bus bridge of claim 1 wherein the component bus bridge enables a hierarchical configuration space access mechanism from the system component bus to the local component bus.

4. The intelligent bus bridge of claim 3 wherein the component bus bridge contains configuration registers that the local processor writes to, the configuration registers then enabling the hierarchical configuration space access mechanism if the mode control input indicates the host master mode.

5. The intelligent bus bridge of claim 1 wherein the local processor writes a configuration register in the component bus bridge to disable the hierarchical configuration space access mechanism if the mode control input indicates the local master mode.

6. A method for accessing a local component bus and a system component bus via an intelligent bus bridge contained in an integrated circuit chip, the method comprising the steps of:

enabling communication to a local processor over a local component bus;

enabling access to a local memory from the local component bus via a local memory controller;

propagating accesses between the local component bus and a system component bus via a component bus bridge; and determining whether the intelligent bus bridge is functioning a local master mode by configuring bus agents coupled to the local component bus or in a host master mode wherein the bus agents coupled to the local component bus are configured via the system component bus, said step of determining being performed by a mode control input pin driven by a mode control signal.

7. The method claim 6 wherein the local memory controller includes a port that enables access to the local memory from the local component bus and a port that enables access to the local memory from a local processor bus of the local processor.

8. The method of claim 6 wherein the component bus bridge enables a hierarchical configuration space access mechanism from the system component bus to the local component bus.

9. The method of claim 8 wherein the component bus bridge contains configuration registers that the local processor writes to, the configuration registers then enabling the hierarchical configuration space access mechanism if the mode control input indicates the host master mode.

10. The method of claim 6 wherein the local processor writes a configuration register in the component bus bridge to disable the hierarchical configuration space access mechanism if the mode control input indicates the local master mode.

11. A computer system, comprising:

a processor coupled for communication over a host bus;

a main memory coupled to the host bus; and an intelligent bus bridge contained in an integrated circuit chip, the intelligent bus bridge comprising:

a local processor coupled for communication over a local component bus;

a local memory controller that enables access to a local memory from the local component bus;

a component bus bridge that propagates accesses between the local component bus and a system component bus; and a mode control input pin driven by a mode control signal, the mode control signal determining whether the intelligent bus bridge functions in a local master mode by configuring bus agents coupled to the local component bus or functions in a host master mode wherein the bus agents coupled to the local component bus are configured via the system component bus.

12. The computer system of claim 11 wherein the local memory controller includes a port that enables access to the local memory from the local component bus and a port that enables access to the local memory from a local processor bus of the local processor.

13. The computer system of claim 11 wherein the component bus bridge enables a hierarchical configuration space access mechanism from the system component bus to the local component bus.

14. The computer system of claim 13 wherein the component bus bridge contains configuration registers that the local processor writes to, the configuration registers then enabling the hierarchical configuration space access mechanism if the mode control input indicates the host master mode.

15. The computer system of claim 11 wherein the local processor writes a configuration register in the component bus bridge to disable the hierarchical configuration space access mechanism if the mode control input indicates the local master mode.

* * * * *